March 24, 1942.  H. M. PFLAGER  2,277,606

RAILWAY TRUCK

Filed Sept. 19, 1940  2 Sheets-Sheet 1

INVENTOR.
HARRY M. PFLAGER
BY Rodney Bedell
ATTORNEY.

March 24, 1942.  H. M. PFLAGER  2,277,606
RAILWAY TRUCK
Filed Sept. 19, 1940  2 Sheets-Sheet 2
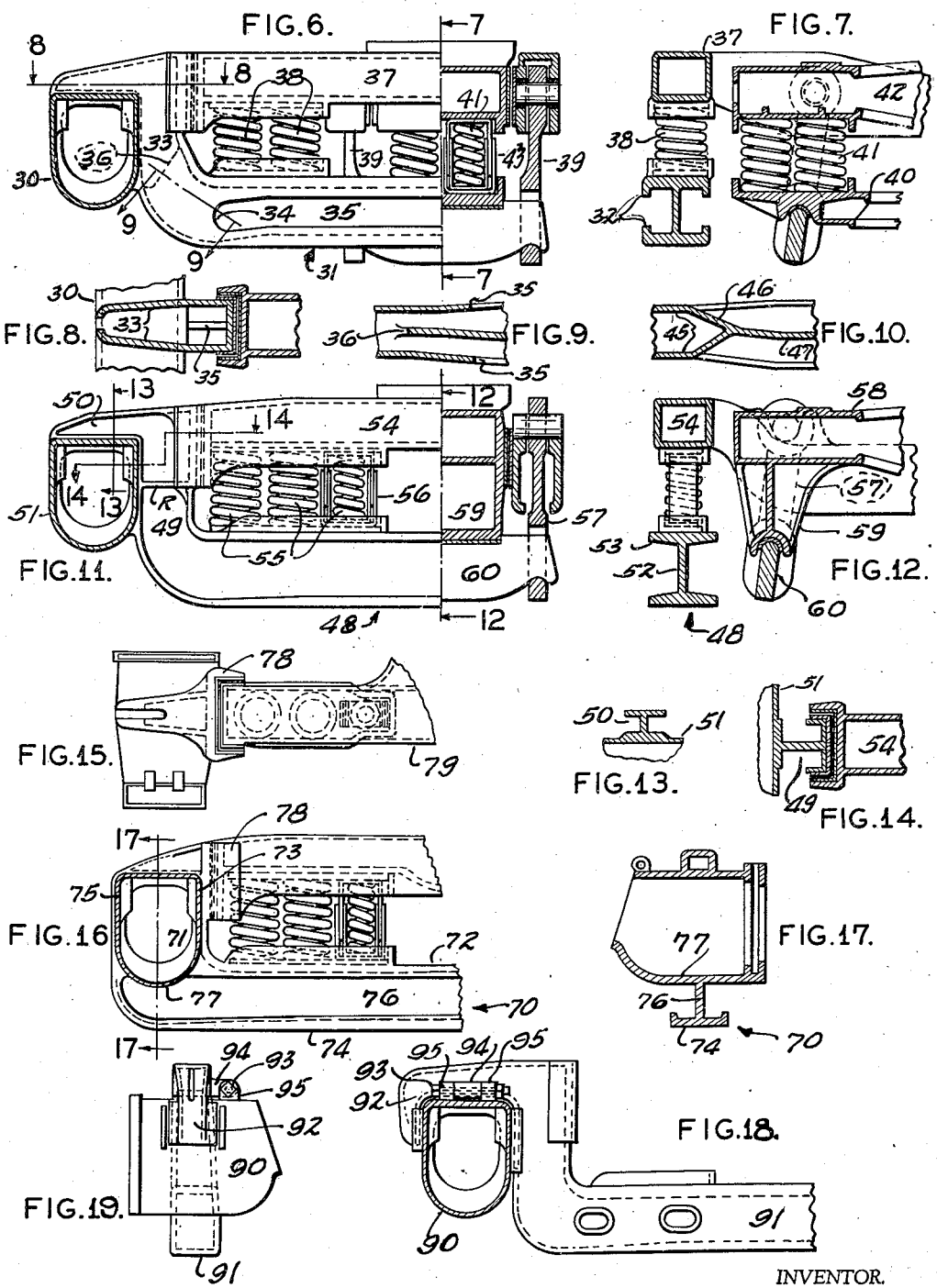
INVENTOR.
HARRY M. PFLAGER
BY
Rodney Bedell
ATTORNEY.

Patented Mar. 24, 1942

2,277,606

UNITED STATES PATENT OFFICE 2,277,606

RAILWAY TRUCK

Harry M. Pflager, St. Louis, Mo., assignor to General Steel Castings Corporation, Granite City, Ill., a corporation of Delaware Application September 19, 1940, Serial No. 357,411

5 Claims. (Cl. 105—208.1)

The invention relates to short wheel base, four-wheel trucks of the lateral motion bolster type which is particularly adapted for various types of high speed railway vehicles.

The main object of this invention is to provide a low, short wheel base, light weight railway truck particularly adapted to negotiate sharp curves and rough track and to ride easily on secondary tracks, and at the same time to produce a truck for maximum safety at high speeds, and at minimum cost.

To produce such a truck, there are used two pairs of wheels placed close together, journal boxes mounted on the axle journals of said wheels and connected by equalizers, said journal boxes on each side of the truck forming part of an equalizer extending from wheel to wheel, thus equalizing the load on each wheel, regardless of the high or low spots in the track. On said equalizers are placed springs adjacent to the ends of the equalizer, which springs support a truck frame, said truck frame frictionally engaging said equalizers to maintain the equalizers in parallel relation and to prevent relative movement of the equalizers and frame longitudinally of the truck while accommodating their relative vertical movement.

The truck frame mounts swing hangers which support a bolster, preferably through a spring plank or spring block which carries elliptic or coil springs on which the bolster is mounted and is provided with center plate and side bearings thereby providing for lateral motion of the body in relation to the truck frame, axles and wheels and to the rails. The bolster swings with the bottom of the swing hangers to absorb the lateral shocks and maintain the body of the car in proper position when rounding curves at high speeds.

The main object and other detailed objects of the invention are attained by the structure illustrated in the accompanying drawings in which—

Figure 6 is a side elevation and section corresponding to Figure 2 but illustrating another form of the invention.

Figure 7 is a vertical transverse section taken on the line 7—7 of Figure 6.

Figures 8 and 9 are detail substantially horizontal sections taken on the corresponding section lines of Figure 6.

Figure 10 is a detail section corresponding to Figure 9 but illustrating another arrangement of the equalizer upright webs.

Figure 1:
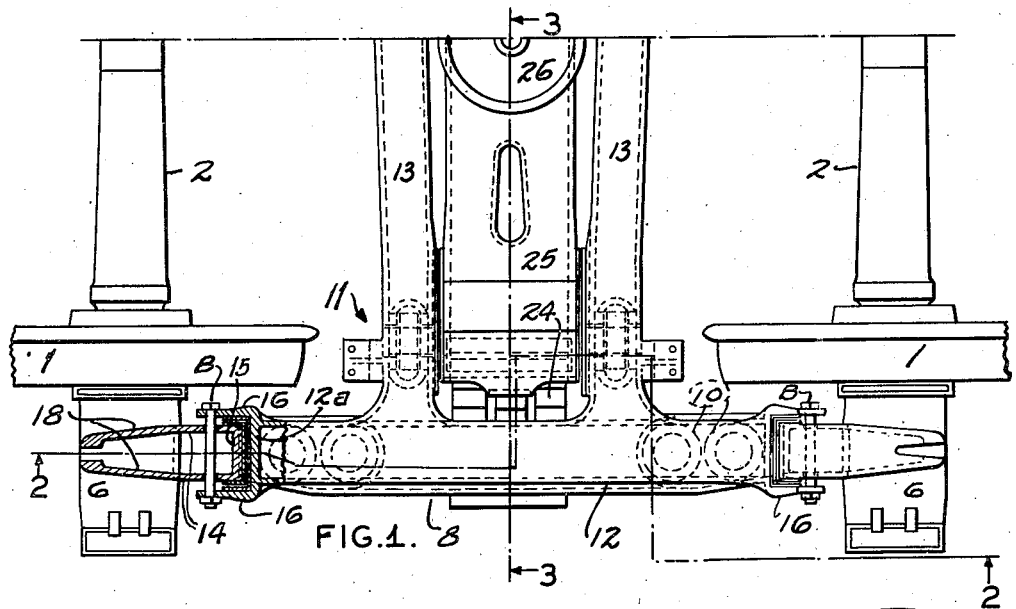
Figure 1 is a top view of one longitudinal half of a railway truck embodying the invention, a portion of the structure being sectioned horizontally for better illustration, the view and section being taken on the line 1—1 of Figure 2.

Figures 11 and 12 correspond to Figures 6 and 7 but illustrate another form of the invention.

Figures 13 and 14 are vertical and horizontal sections respectively taken on the corresponding section lines of Figure 11.

Figure 15 is a top view and Figure 16 is a side view of one end of a journal box equalizer and associated frame and spring structure embodying another form of the invention.

Figure 17 is a vertical section on the line 17—17 of Figure 16.

Figure 18 corresponds to Figure 16 but illustrates another form of the invention.

Figure 19 is an end view of the structure shown in Figure 18.

The truck shown in Figures 1–5 includes wheels 1, axles 2 having journals 3. A unitary axle box and equalizer structure extends between journals 3 at the same side of the truck and each axle box has side walls 4 and 5, walls 4 facing towards the ends of the truck and walls 5 facing towards the middle of the truck. Each box also includes top and bottom walls 6 and 7 respectively. The drop equalizer between boxes includes an elongated horizontal member 8 of box section forming seats 9 for the upright coil springs 10 upon which the truck frame 11 is supported.

The frame includes a pair of side members 12 of box section with end walls 12a and includes a pair of transom members 13 of box section extending between and merging with side members 12.

Projecting inwardly from each axle box are upright webs 14. At the inner edges of webs 14 there is a web 15 extending transversely of the equalizer structure and the truck and parallel to and spaced from box wall 5. Frame side members 12 have flanges 16 for receiving between them the front and rear webs 14 of the upright portions of the equalizer structure. Elements 12a, 14, 15 and 16 interfit each other to prevent displacement of the frame and equalizer structure transversely and longitudinally of the truck but permitting their relative vertical movement due to the action of springs 10.

Horizontal bolts B through flanges 16 and vertical slots S in webs 14 limit the relative vertical movement of the frame and equalizer and box structure. Ordinarily this limit of relative vertical movement will not be reached, but these parts may function as described if the truck is raised by a sling passed under transoms 13 or the parts may function in event of derailment to maintain the assembly of the frame and equalizer and box structure. If desired, elements 12a, 14, 15 and 16 may be provided with renewable wear plates as shown.

Member 8 and elements 5, 14 and 15 form a continuous box section between the journal boxes, and this shape of section, but with diminished area, is continued over the axle journals by means of the box top walls 17 and webs 18 and 19.

Swing hangers 20 are pivotally supended by pins 21 from the end portions of transoms 13 and mount a cross bar 22 which carries a spring plank 23 extending across the truck and mounting elliptic springs 24 which project outwardly between coil springs 10 at opposite ends of the truck and between equalizer member 8 and the frame side member 12. A bolster 25 is carried by springs 24 and is provided with the usual center plate 26 for supporting the truck load.

By making the equalizers and the journal boxes of unitary construction and of a cross section including webs extending longitudinally and transversely of the truck, it is possible to bring the upright coil springs close to the axle journals and provide room for the elliptic springs without unduly increasing the wheel base of the truck. This arrangement also provides a maximum saving in weight by a better distribution of the metal where the webs form parts of the journal box and equalizer.

The elimination of pedestals also decreases the weight of the truck without affecting its efficiency from the standpoint of easy riding qualities due to the double spring suspension and lateral movement mounting of the bolster.

The present truck is preferred to trucks previously used which did not include equalizers but had springs mounted directly on the journal boxes to support the truck frame. In such trucks, while the springs act quickly to cushion shocks, there will be an uneven distribution of loads on the wheels because there are no equalizers and this is a disadvantage from the standpoint of safety of operation.

The present truck is preferable to trucks in which the journal boxes are rigid with the ends of truss-shaped side members, as in the ordinary freight car trucks, in which the truck springs carried by the middle portion of the truck side frames directly support the truck bolsters. While in this type of truck the loads are distributed evenly between the wheels, nevertheless the springs are located so far from the axle journals that they act more slowly to cushion rail shocks and to keep the wheels on the rail, especially since the side frames must be made relatively heavy because of the greater bending moments to which they are subjected by the central location of the load. In the present truck the lateral shocks are absorbed by the action of the swing hangers and the vertical shocks are first transmitted through the equalizer springs and then through other truck parts and through the bolster springs. This double spring arrangement greatly contributes toward easy riding conditions because the vertical shocks must be transferred through two sets of springs. Since the bolster springs are of the elliptic type they act also as snubbers due to the friction between the leaves, thus tending to eliminate any synchronization of vibrations of the bolster and equalizer springs and also tending to reduce the rebound vertical action of the bolster. This is preferable to the ordinary freight car truck referred to above which has only one set of springs between the side frames and the bolster, or other trucks in which the bolsters are formed integral with the side frames with springs located only between the equalizers and the side frames or without equalizers but with springs located between the journal boxes and the truck side frame.

Figures 6, 7, 8 and 9 illustrate a form of the invention in which the axle box 30 and the adjacent equalizer web structure correspond generally to that previously described, but the elongated lower member 31 of the equalizer is of I-shaped cross section, the upper and lower horizontal flanges preferably terminating in lips 32 which merge with the side walls 33 of the equalizer box section upright parts extending over the box and downwardly around the lower corner of the equalizer and terminate at 34. The main vertical web 35 of the I-section extends upwardly around the lower corner to the point indicated at 36.

This arrangement provides a lighter section throughout the elongated part of the equalizer but retains the heavier, stronger box section adjacent to the axle box and provides the additional feature of overlapping webs at the lower corner of the equalizer structure whereby the overall depth of the equalizer at this point may be minimized for a given load.

The truck frame 37 corresponds to that previously described and similarly interfits the upright portions of the equalizer structure so as to prevent relative movement of the frame and equalizer transversely and longitudinally of the truck while permitting their relative vertical movement due to the action of springs 38.

Figure 2:
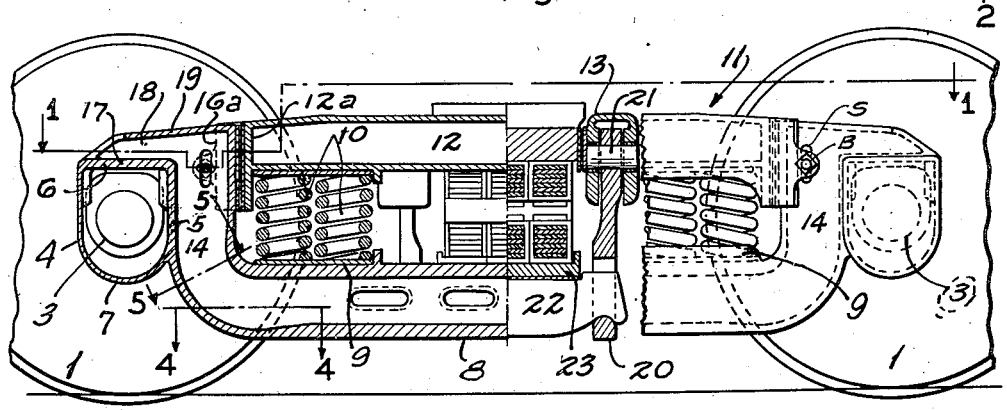
Figure 2 is a vertical longitudinal section and elevation taken on the line 2—2 of Figure 1.
Figure 3:
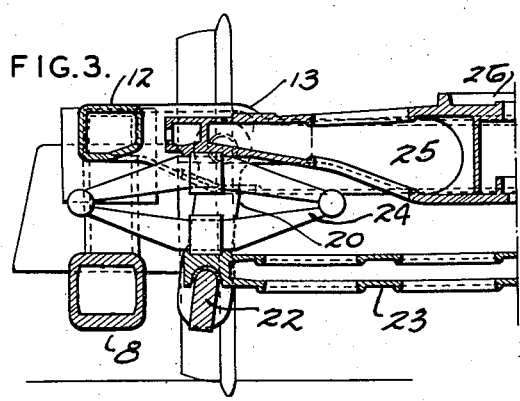
Figure 3 is a vertical transverse section taken on the line 3—3 of Figure 1.
Figure 4:
Figures 4 and 5 are detail sections substantially horizontal taken on the corresponding section lines of Figure 2.
Figure 5:
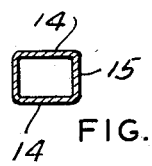

Swing hangers 39 are suspended from frame 37 and carry the spring plank 40 as in the structure previously described, but in place of the elliptic springs illustrated in Figures 1–3 there is used a group of coil springs 41 for supporting the bolster 42, preferably at least one of springs 41 being equipped with a friction snubbing device 43 whereby the oscillations of the bolster springs will be dampened. This arrangement makes possible the use of more economical coil springs for supporting the bolster and avoids the projection of the bolster spring structure over the equalizer, thereby accommodating a lower level for the spring plank and, if otherwise desired, a shortening of the wheel base.

Figure 10 illustrates a modification of the vertical web arrangement of the equalizer structure shown in Figures 6–9. The spaced webs 45 of the box section portion of the equalizer converge at their inner ends as indicated at 46 to merge with each other and with the outer end of the main central web 47 of the spring-carrying portion of the equalizer.

Figures 11 and 12 illustrate another form of the invention in which the I-shaped cross section of the elongated lower member 48 of the equalizer is continued throughout the upright end part 49 and the upper part 50 extending over the journal box forming portion 51 of the structure. The main I-beam section has the conventional web 52 and flange 53 arrangement, the vertical lips at the edges of the flanges, as shown in Figure 7, being omitted. The I-section may be reenforced by one or more transverse webs R.

The truck frame 54 corresponds to those previously described but is supported upon equalizer 48 by a series of six coil springs 55 (three only being shown), and one or more of springs 55 is provided with a friction snubbing device 56 for dampening the vertical oscillations of the springs.

Frame 54 supports swing hangers 57 as previously described but the truck bolster 58 has depending legs 59 at its ends resting directly upon the swing hanger cross bars 60. With this arrangement the spring plank and bolster springs are eliminated, substantially reducing the weight and expense of the structure. The additional spring arrangement for supporting the frame is designed to take the place of the bolster springs.

Figures 15, 16 and 17 illustrate another form of the invention in which the I-shaped lower member 70 of the equalizer extends beneath the portion of the structure forming the journal box 71, the top flange 72 of the I-section merging with the inner wall 73 of the box and the lower flange 74 of the I-section merging with the outer wall 75 of the box and the web 76 of the I-beam merging with the box lower wall 77.

A jaw-like member 78 projects from box inner wall 73 above the elongated member 70 to receive between its flanges the box-shaped end portion of the truck frame side member 79. This interfitting of the frame and equalizer and journal box structure prevents relative movement of these parts transversely and longitudinally of the truck without interfering with their relative vertical movement as in the structures previously described.

With this arrangement elongated member 70 provides a spring seat element 80 substantially closer to the axle journal and can be obtained in the forms previously described in which the upright end portion of the equalizer at the inner side of the box is of substantial cross-sectional dimensions to provide adequate strength at this point.

Figures 18 and 19 illustrate another form of the invention in which the box 90 and the equalizer 91 are formed separately from each other, the equalizer being of box section substantially from end to end and in this respect resembling the equalizer member shown in Figures 1-5 but including a depending end portion 92 whereby a downwardly opening jaw is provided to receive the axle box. A bolt 93 is passed through cooperating lugs 94 and 95 on the equalizer and box respectively and cooperates with the jaw to interlock the box and equalizer.

Obviously the cross section of the equalizer may be of I-shape or a combination of I-shape and box-shape as indicated in Figures 11 and 6 respectively.

Each form of the invention attains the general objectives set forth in the introductory portion of the specification and each form of the invention has detail advantages over the other forms which may better adapt it for use under special conditions. The form used will depend upon the load to be supported by the truck, the wheel base, the space required between the frame supporting springs, the importance of being able to disassemble the equalizer and boxes, and other reasons.

It is to be understood that the different cross sections of equalizers and the different spring arrangements are interchangeable, in other words, the bolster supporting elliptic springs shown in Figures 1-3 may be used in place of the coil springs of Figures 6 and 7 and the bolsters of Figures 1-9 may be supported directly upon the swing hanger cross bars, as shown in Figures 11 and 12, and either type of the bolster supporting spring illustrated in Figures 1-7 or the spring plankless arrangement of Figures 11 and 12 may be used with the equalizer structures of Figures 15-18.

The details of the construction may be varied otherwise than as indicated above without departing from the spirit of the invention, and the exclusive use of the modifications illustrated and others which may occur to those skilled in the art is contemplated.

What is claimed is:

1. In a railway truck, spaced axles, wheels fixed thereon, a unitary U-shaped equalizer structure comprising upright guide members adjacent the ends of said axles at the same side of the truck, and a horizontal beam member merging with the lower portions of said guide members, each guide member including upright webs extending transversely of the truck and spaced apart longitudinally of the truck, there being webs interconnecting said first-mentioned webs and forming therewith a rigid section of substantial depth transversely and longitudinally of the truck, the outer of said transverse webs forming an axle box side wall, said unitary structure opening upwardly between said guide members, springs seated on said horizontal beam member adjacent said upright guide members, and a truck load-carrying frame carried on said springs and extending from one of said guide members to the other and terminating in upright elements disposed transversely and longitudinally of the truck and opposing similarly disposed upright elements on said guide members, whereby the truck frame and unitary structure may move vertically relative to each other while they are held against displacement relative to each other longitudinally and transversely of the truck.

2. In a railway truck, spaced axles, wheels fixed thereon, journal boxes rotatably mounting said axles, an equalizer horizontal beam member extending between and formed integral with said journal boxes and including vertically spaced top and bottom webs, the bottom web being turned upwardly at the ends of the beam and each upturned portion forming a journal box upright side wall extending transversely of the truck between the journal and the equalizer beam, the beam top web being turned upwardly at the ends of the beam and each upturned portion forming an upright wall extending transversely of the truck and spaced from the adjacent journal box upright side wall formed by the upturned portion of the beam bottom web, the beam also including an upright web member extending longitudinally of the truck and connecting said upright walls and forming therewith rigid vertical guide devices adjacent the axles, each device being of deep section transversely and longitudinally of the truck, springs seated on said beam adjacent said guides, and a truck load-carrying frame mounted on said springs and positioned at approximately the same level as the tops of said boxes and terminating adjacent the guide devices, said devices and wheel piece ends including interfitting upright bearing elements preventing displacement of the frame transversely and longitudinally of the truck relative to said boxes.

3. A structure as described in claim 2 in which the equalizer beam member is of box shape in vertical section and each guide member is of box shape in horizontal section.

4. A truck as described in claim 2 in which the equalizer beam member is I-shaped in vertical cross section with the center web of the I-section disposed vertically and with the flanges of the I-section disposed horizontally and said flanges are turned upwardly at the ends of the equalizer beam member to form the guide member webs extending transversely of the truck.

5. A truck as described in claim 2 in which the equalizer beam member is I-shaped in vertical cross section with the center web of the I-section disposed vertically and with the flanges of the I-section disposed horizontally and said flanges are turned upwardly at the ends of the equalizer beam member to form the guide member webs extending transversely of the truck, the guide member webs extending longitudinally of the truck being spaced apart to render the guide members box-shaped in horizontal section, said latter-mentioned webs and the upright center web of the I-section overlapping each other where each upright guide member meets the horizontal equalizer beam member to form a rigid corner section.

HARRY M. PFLAGER.